US011476613B1

(12) United States Patent
Ismailov

(10) Patent No.: US 11,476,613 B1
(45) Date of Patent: Oct. 18, 2022

(54) CAP SECURITY SYSTEM

(71) Applicant: Olimjon Ismailov, Naperville, IL (US)

(72) Inventor: Olimjon Ismailov, Naperville, IL (US)

( * ) Notice: Subject to any disclaimer, the term of this patent is extended or adjusted under 35 U.S.C. 154(b) by 16 days.

(21) Appl. No.: 17/316,781

(22) Filed: May 11, 2021

(51) Int. Cl.
| | |
|---|---|
| *B60D 1/64* | (2006.01) |
| *H01R 13/52* | (2006.01) |
| *B62D 53/06* | (2006.01) |
| *H01R 13/639* | (2006.01) |
| *H01R 13/447* | (2006.01) |

(52) U.S. Cl.
CPC ......... *H01R 13/5213* (2013.01); *B60D 1/64* (2013.01); *B62D 53/06* (2013.01); *H01R 13/447* (2013.01); *H01R 13/6397* (2013.01); *H01R 2201/26* (2013.01)

(58) Field of Classification Search
CPC ............ H01R 13/5213; H01R 13/6397; H01R 13/447; B60D 1/64
See application file for complete search history.

(56) References Cited

U.S. PATENT DOCUMENTS

| | | | | |
|---|---|---|---|---|
| 4,526,104 A | * | 7/1985 | Brauer | F42C 15/188 |
| | | | | 102/223 |
| 2017/0108104 A1 | * | 4/2017 | Tiziani | F16H 48/24 |

FOREIGN PATENT DOCUMENTS

| | | | | |
|---|---|---|---|---|
| EP | 2535985 B1 | * | 7/2016 | .......... B60L 11/1818 |
| ES | 2804276 T3 | * | 2/2021 | .............. B60L 53/16 |

\* cited by examiner

*Primary Examiner* — Tho D Ta
(74) *Attorney, Agent, or Firm* — Aronberg Goldgehn Davis & Garmisa

(57) ABSTRACT

The present system generally relates to a tamper resistant cap that prevents unwanted access to a semi-tractor trailer's 7 ways connection. The system includes a controller that can be operated remotely to transmit signals to an actuator within the cap. The actuator operates a lock to secure the cap in the closed position and selectively unlock the lock to allow the cap to be opened.

14 Claims, 7 Drawing Sheets

CAP SECURITY SYSTEM

BACKGROUND OF THE INVENTION

Semi-tractor trailers mate with the main cab through a connection cable attached to the main cab that mates with plug on the external front of a tractor trailer (e.g. the 7 ways connection). To protect the tractor trailer plug from the elements when disconnected, the plug is covered by a cap. The cap may be lifted so that the trailer may be plugged in. Unfortunately, there is a problem with theft of tractor trailers. Because the connection plugs on tractor trailers are universal, anyone with a cab can approach a waiting trailer, such as a trailer at a depot, and connect the tractor trailer to their cab to steal the trailer and cargo within. Thus there is a need for a solution that will deter would be thieves from stealing waiting trailers.

SUMMARY OF THE PRESENT SYSTEM

The present system provides a simple solution that locks the connection plug on the trailer to prevent unauthorized access to the plug. The cap of the plug is fitted with a lock and actuator. A controller is provided in a compartment on the tractor trailer and is connected to the actuator. The controller may be provided with a transceiver, such as to allow for Bluetooth, wi-fi, cellular tower, or other wireless communication. The controller may be activated to cause the actuator to unlock the cap and allow access to the plug. For example, a remotely located dispatcher can connect to the trailer controller through an internet connection. The dispatcher can issue a command to the controller to unlock, and the controller will transmit a signal to the actuator to unlock the cap. The dispatcher can likewise issue a command to lock the cap and the controller will activate the actuator to lock the cap. Alternatively, a driver may be provided with an application, such as on a mobile device, that allows for communication with the trailer controller. When in wireless range, such as Bluetooth range, the driver can use the application to transmit lock/unlock instructions. The application may be connected to a remote server that is likewise connected to a dispatcher. The dispatcher can control which trailers the driver is able to lock and unlock. For example, each trailer controller may be provided with a unique code. The dispatcher transmits the code to the driver application. For security, the code may be encrypted so that the driver is not able to determine the code. The dispatcher sends the driver information necessary to identify the relevant tractor trailer corresponding to the unique controller code. The driver may then approach the correct trailer, use Bluetooth (or similar short or near field communication or SMS communication) to connect to the trailer controller and transmit the unique code to thereby unlock cap of that trailer. Thus, a dispatcher is able to control access to the trailers and prevent theft. Further embodiments are set forth in more detail below with reference to the drawings.

DETAILED DESCRIPTION OF EMBODIMENTS

Figure 1:
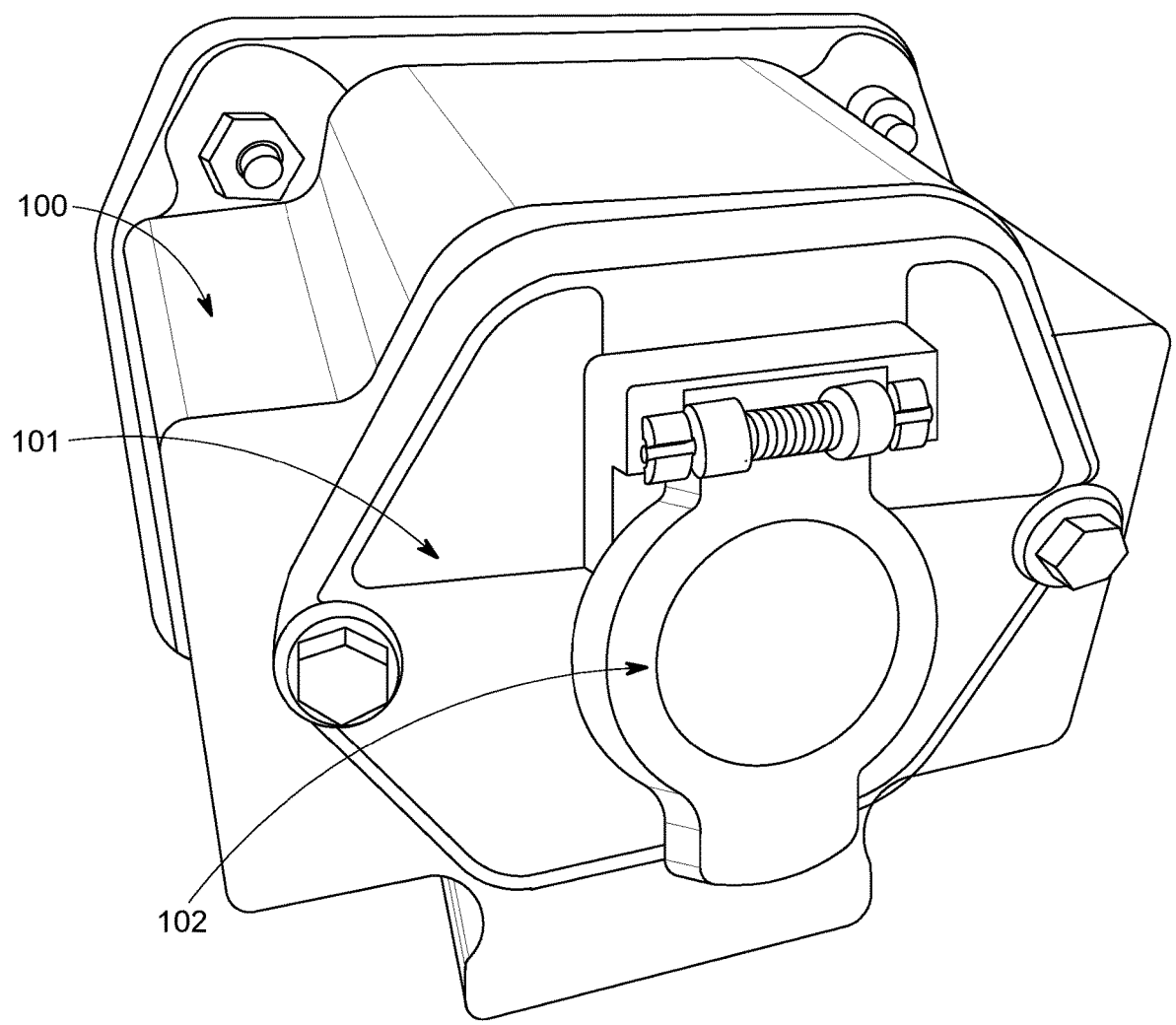
FIG. 1 is a drawing of a prior art connection and cap.

The embodiments of the present system are described with reference to the drawings below. In the drawings, like numbers are used to refer to like elements. Unless otherwise stated, "and" is conjunctive, while "or" is disjunctive and conjunctive such that the condition "A or B" is satisfied by any of "A" alone, "B" alone, and "A and B" together.

FIG. 1 is a depiction of a conventional, prior art tractor trailer connection. It includes an electrical box 100, a face plate 101, and a cap 102 covering the connection port (not shown). To connect a cab to the trailer, a driver simply lifts the cap 102 and plugs in the cab's connection cable.

The present system utilizes the conventional electrical box 100. The faceplate may be conventional or further adapted to accommodate differing embodiments of the present system. The present system utilizes a novel a locking cap. In one embodiment, electrical box 100 houses a control system that operates a locking mechanism within the cap. In another embodiment, the control system is located elsewhere on the trailer, such as inside the trailer cargo compartment, or in a separate housing attached externally to the trailer, such as on the roof or upper corner of the trailer so as to be not readily accessible by a human without use of, for example, a ladder or lift.

The control system includes a controller which may include a receiver, transmitter, or transceiver to send and receive data signals. For example, the controller may include a GSM or GPRS circuit for wireless communications. The controller may be a microcomputer having a processor, memory, inputs, and outputs. The controller may further include a power supply, such as a battery. In one embodiment, the controller may be connected to a renewable energy source, such as a solar panel or wind turbine that may be used to charge, or maintain charge for, the battery. One example of a suitable controller is the ATMEGA 2560, along with a SIM900A GSM GPRS Board, available from Microchip® 2355 West Chandler Blvd. Chandler, Ariz. 85224-6199.

Figure 2:
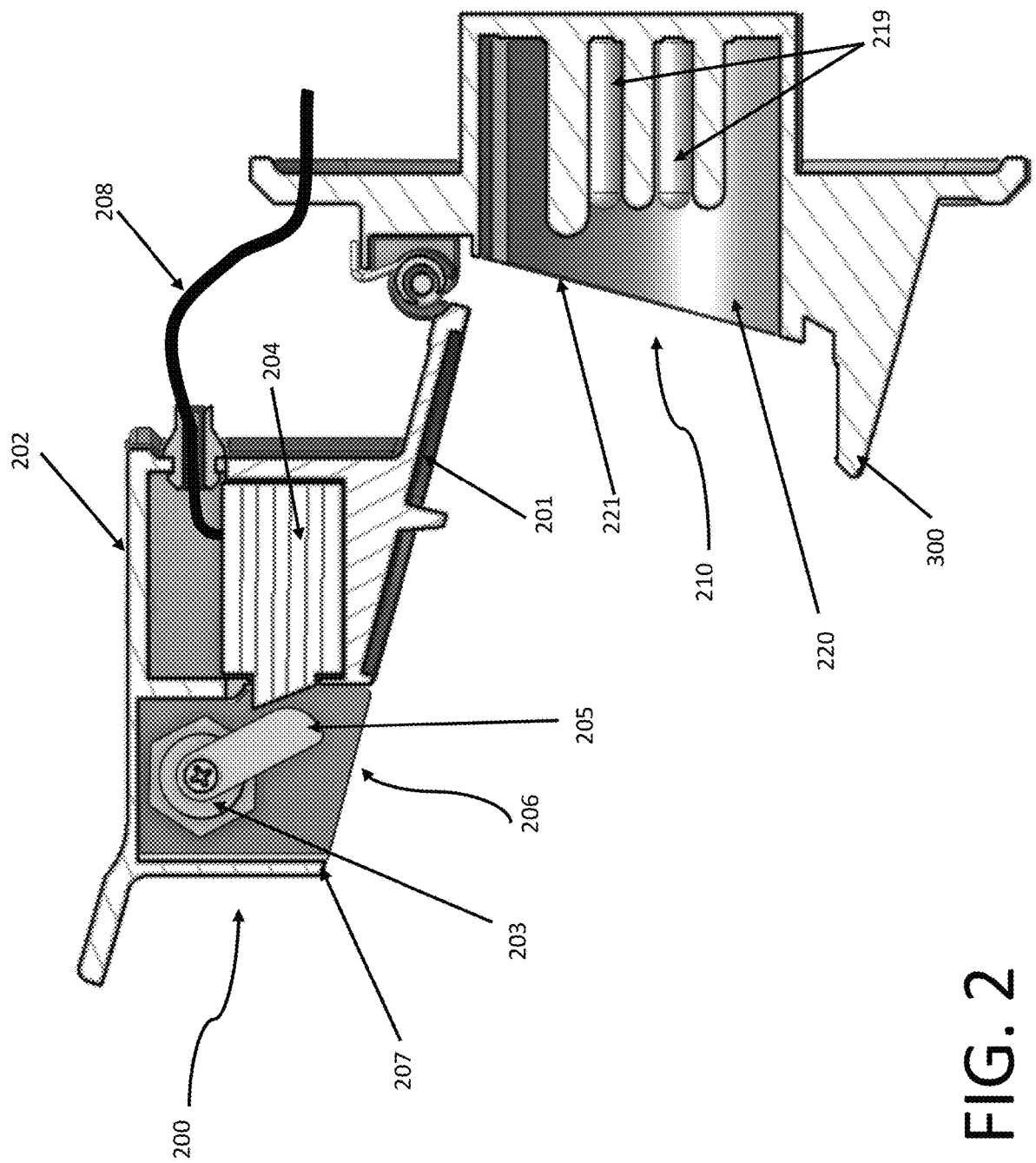
FIG. 2 is a side cutaway view of an embodiment of the present system with the cap in the open position.
Figure 3:
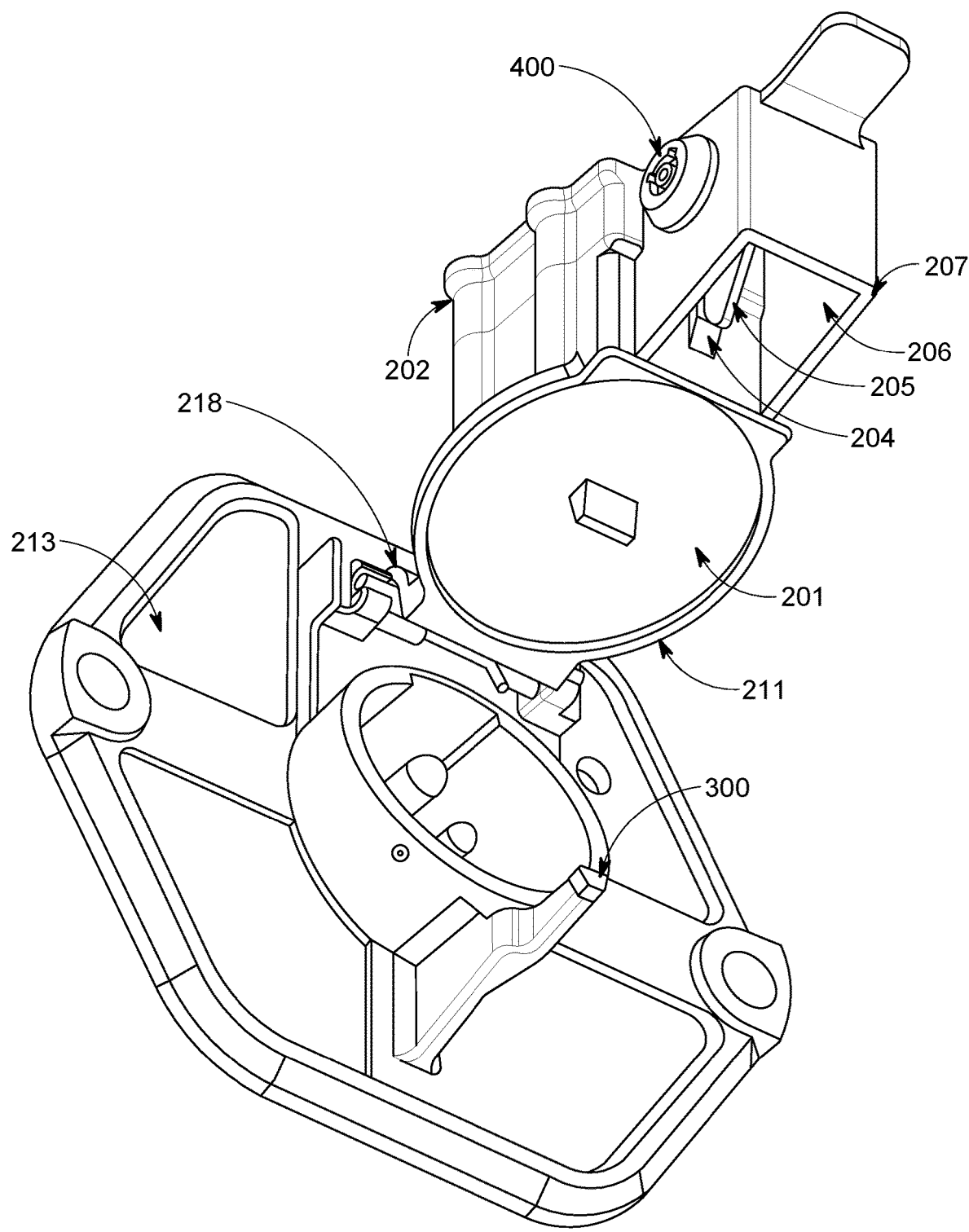
FIG. 3 is a perspective view of an embodiment of the present system with the cap in the open position.
Figure 5:
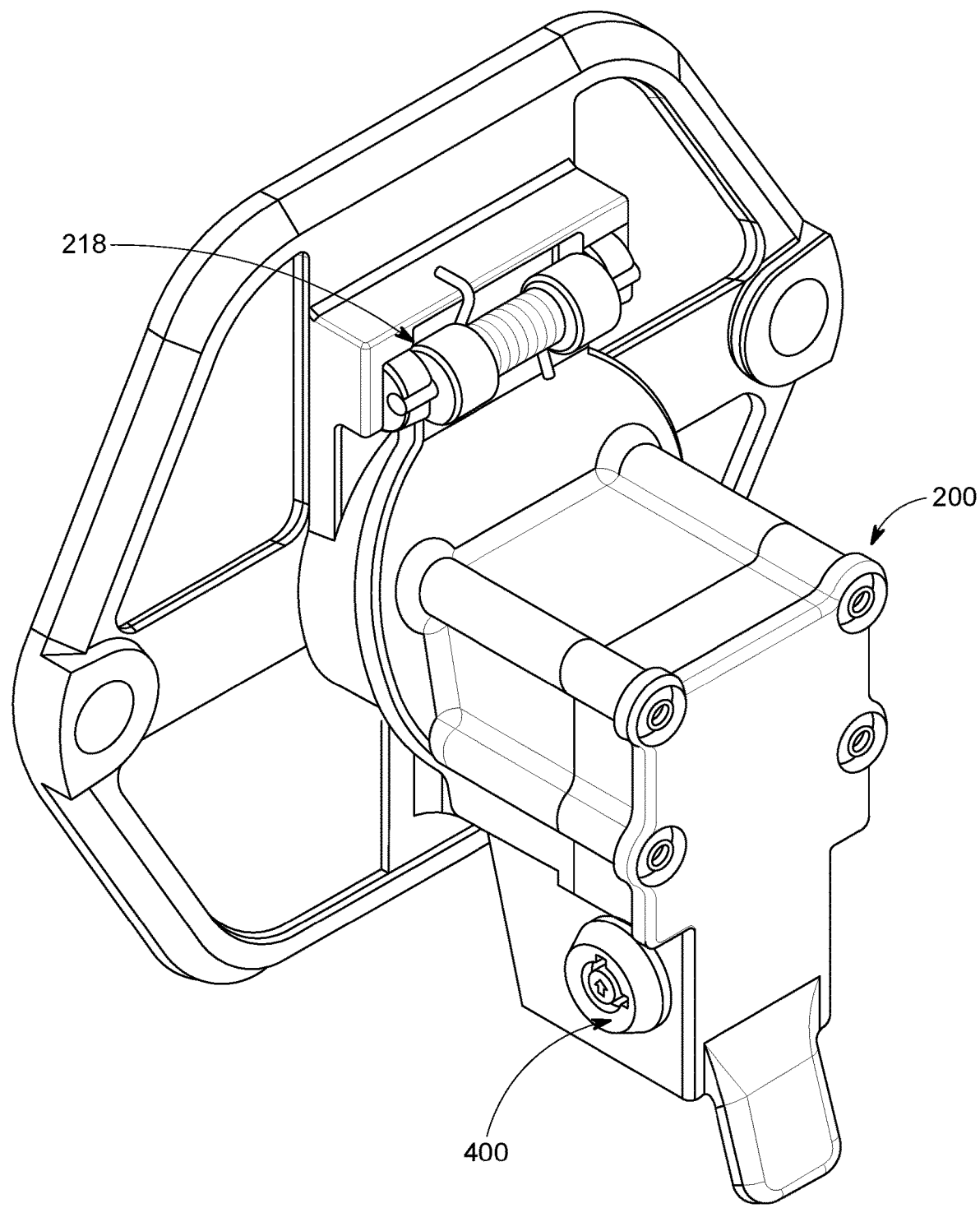
FIG. 5 is a perspective view of an embodiment of the present system with the cap in the closed position.

Referring to FIGS. 2-3, the present system further includes a cap 200. The cap may be connected to a faceplate 213 by, for example, a spring-biased pivot arm 218. The cap may be comprised of two segments (which may be formed integrally or formed of separate pieces that are connected together), a flap 201 that corresponds and covers the trailer connection plug(s) 219 and corresponding connection plug housing 220 (which is the traditional cavity and housing containing one or more connections, e.g. the 7 ways of the trailer) and a cover 202. The cap may be opened, as in FIGS. 2-3, to provide access to the 7-ways, or may be closed, as in FIG. 5, to close off access to the 7-ways.

Figure 4:
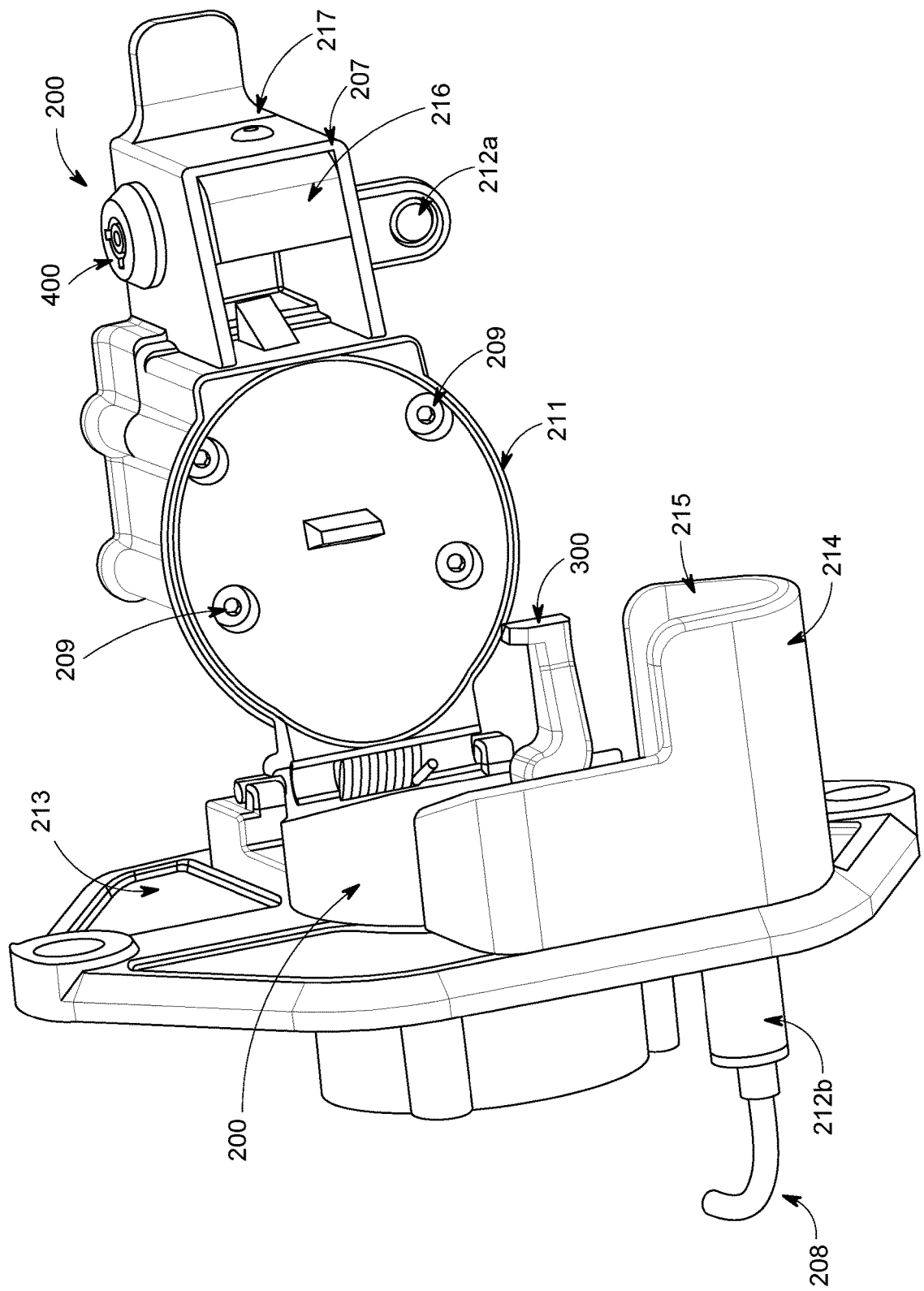
FIG. 4 is a perspective view of an embodiment of the present system with the cap in the open position.

In one embodiment the cover is connected to the flap using a plurality of fasteners 209 such hex bolts or screws. In the embodiment depicted, in FIG. 2 the screws penetrate from the outside of the cover. However, in an alternate embodiment, as shown in FIG. 4, the fasteners 209 are positioned on the inside of the flap, penetrate through the flap and into the cover to provide additional deterrent by not allowing the cover to be removed from the flap while the cap is closed (as the screw heads are located within the cavity of the connection plug when the cap is closed). The flap may also include a circumferential lip 211. The lip 211 may either surround the connection plug rim 221 or fit within the connection plug cavity 210 formed by the connection plug housing 220 to prevent a pry-bar from being slid between the flap and the connection plug when the cap is closed.

The cap houses a lock 203. The lock may be a traditional tumbler and locking arm. The lock may also include a traditional keyhole 400. Thus, in the event of a controller or actuator malfunction, the driver (or authorized user) may utilize a traditional key to release the lock. The cap also includes an actuator 204. For example, the actuator may be a solenoid or servo. When the controller activates the actuator, the actuator causes the lock to open or close depending on the control signal. The lock arm 205 engages with detent 300 (FIG. 3). The lock is housed within the lock cavity 206 of the cap. When the cap is closed, the lock cavity 206 surrounds the detent 300. In one embodiment the lock cavity rim 207 is shaped such that it mates with the faceplate 101. That prevents a potential thief from having easy access to either the lock or detent. It is further conceived that the actuator and lock may be integrated together or be one-in-the-same. For example, in one embodiment, a solenoid is utilized as the actuator, and the solenoid piston is configured to function as the locking arm. When actuated, the solenoid piston is moved into position such that the cap is restrained from opening by, for example, detent 300.

The actuator is connected to the controller. In one embodiment, the actuator is connected to the controller by a cable 208. The cable allows for the controller to control the operation of the actuator. In an alternate embodiment, the controller is connected to one or more of the connections of the connection plug 210. In such an embodiment, the actuator is provided with a socket (not shown) that mates with one or more of the connection plugs when the cap is closed. The controller may then transmit signals to the actuator through the connection plug(s).

In the embodiment of FIG. 4, the cap includes an electrical contact 212a. The electrical contact is connected to the actuator, such as by a wire (not shown). Electrical connection cable 208 may be affixed to the faceplate 213 and terminates in an electrical contact 212b that corresponds to electrical contact 212a such that the electrical contacts mate and provide electrical communication between them when the cap 200 is in the closed position. The configuration of FIG. 4 ensures that the electrical connection (and cable 208) between the cap and the controller can be housed entirely within the trailer, and is not exposed. That prevents a would-be thief from cutting the electrical connection cable 208. The embodiment of FIG. 4 further includes a guard 214 that extends from faceplate 213. The guard includes a guard cavity 215 that surrounds lock cavity rim 207 of the cap as well as the electrical connection 212a when the cap is closed and further accommodates the end of electrical connection 212b. Thus, when the cap 200 is in the closed position, flap 201 seals against the rim 221 of the plug housing 220, lock cavity rim 207 of the cap is positioned within the guard cavity 215, and the electrical contact 212a connects to electrical contact 212b within the guard cavity such that the lock cavity rim 207 and electrical connection 212a are protected by the guard. In one embodiment, contacts 212a and 212b form a data connection for transmitting signals between the controller and the actuator. In another embodiment, the contacts 212a and 212b comprise a sensor that is utilized by the controller to identify whether the cap is in an open position or closed position. To further protect the lock, the cap may include plate 216 positioned within lock cavity 206. The plate 216 partially closes the lock cavity 206, while still providing an opening to accommodate detent 300. The plate 216 may be secured to the cap by fastener 217. In one embodiment the fastener 217 is a screw that allows for the attachment and removal of the plate 216 to allow access to the lock 203 in the event that the lock requires servicing. The guard 214 may extend far enough so that the fastener 217 is obscured by the guard when the cap is in the closed position.

The controller allows for communication with external devices. For example, in one embodiment, the controller is configured to transmit and receive data by SMS message. Data, such as instructions to open, is received by the controller and processed. The controller then activates the actuator to open the lock. The message may be generated by a dispatcher utilizing a dispatcher controller, such as a personal computer. The personal computer may have access to a database, such as a locally stored database on the computer or a cloud based database stored on one or more servers. The database may include information regarding trailers equipped with the caps and controllers of the present system. For example, the database may include identification information allowing the dispatcher to particularly identify individual trailers or corresponding controllers connected to the trailers. The database may contain information about the location of the trailer, whether it has been assigned to a job, identification information (such as a VIN or similar number), and identification of the controller for the cap (such as a unique access code). To unlock a cap, the the dispatcher selects the appropriate trailer (or cap controller) and selects an open command which causes the dispatcher controller/computer to transmit the command to the trailer, such as through an internet connection and wi-fi link, or through the use of a cell tower. Alternatively, the dispatcher can cause the dispatcher controller to transmit a unique access code to a truck driver, such as by sending it to a mobile device of the driver who may then utilize, for example, Bluetooth connectivity to transmit the command to the controller. In another embodiment, the cap is provided with a QR code. The driver scans the QR code with a mobile device, such as a mobile phone, which then transmits data regarding the trailer to the dispatcher. The dispatch controller may then transmit a signal to the controller 501, and in response to receiving the signal from the dispatch controller, the controller 501 can issue a command to the actuator to open the cap. Using GPS, cell tower triangulation, or similar positional techniques, the controller may communicate with the dispatcher controller to provide positional information and allow the dispatcher to determine the location of the associated trailer. That allows the dispatcher to know where trailers are located and selectively unlock trailers for drivers.

Figure 6:
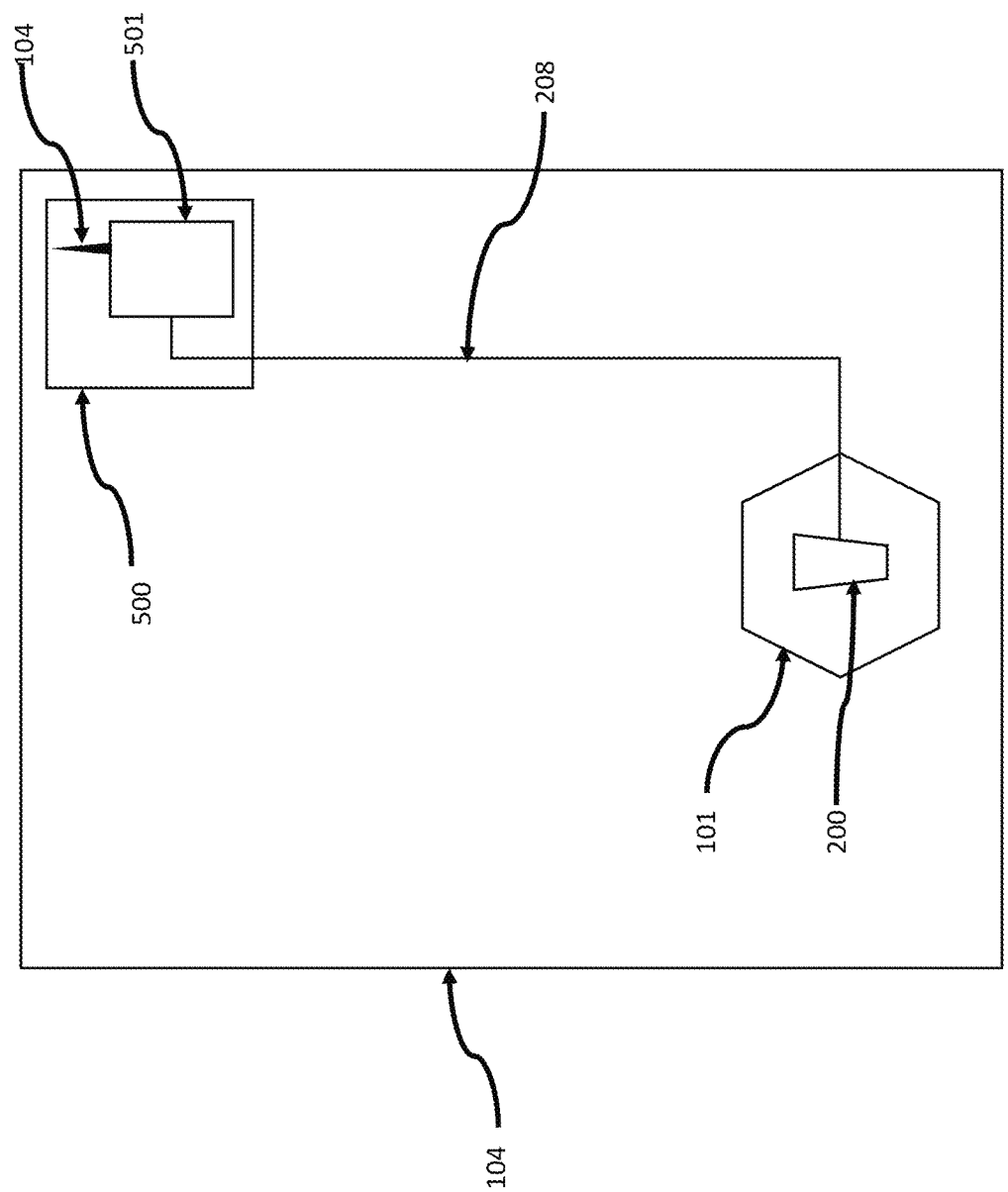
FIG. 6 is a block diagram of an embodiment of the present system.

A block diagram in FIG. 6 depicts the general arrangement of the system. The font face of a tractor trailer is depicted generally as 104. A housing 500 may be mounted to the trailer. In one embodiment the housing is within the interior cavity of the trailer, in another embodiment it is mounted to the exterior. The controller 501 is mounted within the housing. The housing protects the controller from damage, such as vandalism or weather. The controller may include an antenna 502 for assisting in the receipt or transmission of data and control signals. The controller is electrically connected to the cap. For example, cable 208 connects the controller and cap. In one embodiment, the cable 208 is routed on the interior of the trailer cavity to protect it from vandalism, tampering, or other damage.

The cap may also include anti-tamper sensors (not shown). For example, the cap may include a vibration sensor. In one embodiment, a portion of the sensor is included within the electrical box 100 and connected to a second portion of the sensor located in the cap 200. Alternatively, the sensor could be housed within the cap and connected to the controller. Alternatively, the sensor may be housed within the electrical box 100 and monitor the cap such that impact to the cap triggers the sensor within the electrical box. For example, upon impact to the cap or controller housing (e.g. electrical box), the sensor detects the vibrations from the impact and transmits a signal to the controller. The controller includes executable code that is triggered by the receipt of a signal from the sensor. The executable code, once triggered, may cause the controller to further trigger an alarm at the site of the trailer, such as a siren, or transmit a signal to the dispatcher (or driver app) with an alert that the cap is being tampered with. That will allow the dispatcher (or driver) to alert the authorities or go personally inspect the trailer. For example, the controller may be adapted to monitor the electrical connection between electrical contact 212a and 212b. In the event that the electrical connection between electrical contact 212a and 212b is broken, the controller is adapted to transmit a signal to the dispatch controller identifying the broken connection, such as by transmitting a "cap open" signal. In the event that the dispatcher did not authorize the opening of the cap, the receipt of a signal identifying a broken connection signifies that the cap or trailer is being tampered with.

Figure 7:
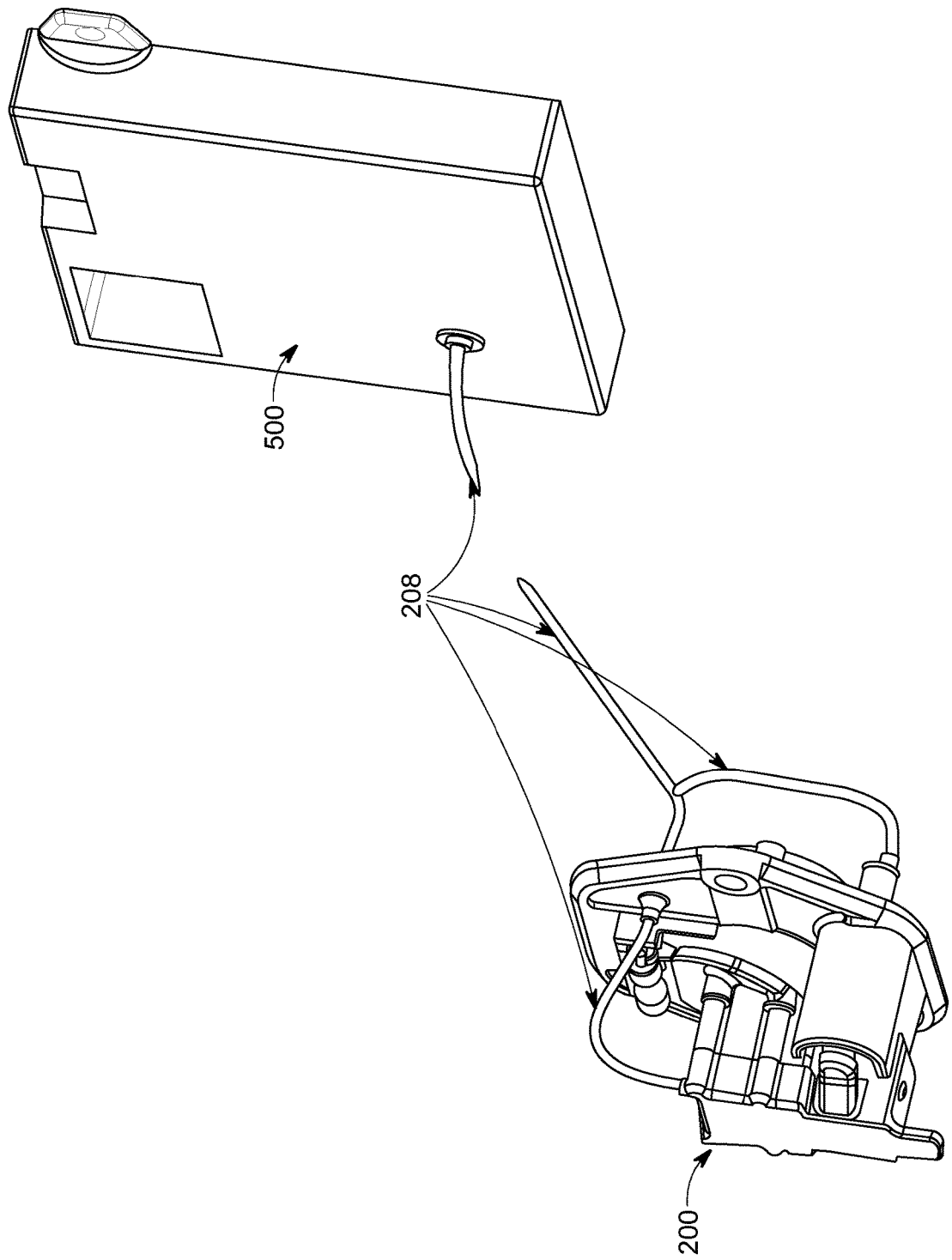
FIG. 7 is a perspective view of an embodiment of the present system depicting the relationship between the cap and the controller housing.

FIG. 7 is a depiction of an embodiment of the cap in connection with the controller within housing 500. As discussed, the housing may be located remotely from the cap, such as in an upper corner of a trailer. The controller may be connected to the actuator and electrical contact 212b by cable 208 and electrical signals may be transmitted between the actuator and electrical contact via the cable 208 to the controller housed within the controller housing 500.

Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A cap security system comprising:
a cap,
an actuator,
a lock,
a controller connected to the actuator,
wherein the cap comprises at least one cavity that accommodates the actuator and the lock; and
wherein the cap includes a flap that is adapted to cover an electrical connection port of a tractor trailer.

2. A cap security system as in claim 1, wherein the controller is connected to a dispatch controller, the dispatch controller is adapted to transmit one or more data signals to the controller, and the controller is adapted to actuate the actuator in response to the one or more data signals.

3. A cap security system as in claim 2, wherein the controller is adapted to transmit positional information to the dispatch controller.

4. A cap security system as in claim 3, further comprising a sensor connected to the controller wherein the controller is adapted to transmit the positional information to the dispatch controller upon receipt of a signal from the sensor.

5. A cap security system as in claim 1 wherein the controller is located remotely from the cap, but is in electrical communication with the actuator.

6. A cap security system comprising:
a cap, a faceplate, and a controller,
the cap comprising:
a first segment and a second segment that together form a lock cavity and a flap;
a lock having a lock arm positioned within the lock cavity and an actuator positioned within the lock cavity such that the actuator is capable of moving a portion of the lock arm when the actuator is actuated;
the faceplate comprising:
a connection plug housing forming a connection plug cavity wherein the connection plug housing terminates in a circumferential rim; and
a detent;
wherein the cap is connected to the faceplate such that the flap covers the connection plug cavity when the cap is in a closed and locked position and such that the connection plug cavity is exposed when the cap is in an open position;
wherein the lock arm is configured to engage the detent when the cap is in the closed and locked position; and
wherein the controller and the actuator are in electrical communication when the cap is in the closed and locked position.

7. The cap security system of claim 6 wherein the first segment and second segment are secured together by one or more fasteners such that the one or more fasteners penetrate through the second segment and connect to the first segment and the one or more fasteners are inaccessible when the cap is in the closed and locked position.

8. The cap security system of claim 6 wherein, when the cap is in the closed and locked position, the lock arm engages the detent.

9. The cap security system of claim 6 further comprising:
a guard extending from the faceplate, the guard defining a guard cavity;
a first electrical connection attached to the cap;
a second electrical connection positioned within the guard cavity, wherein the lock cavity includes an opening defined by a lock cavity rim.

10. The cap security system of claim 9 wherein the lock cavity rim is positioned within the guard cavity when the cap is in a closed and locked position.

11. The cap security system of claim 9 wherein the first electrical connection and the second electrical connection are in electrical communication when the cap is in a closed and locked position.

12. The cap security system of claim 6 wherein the lock includes a keyhole that is accessible when the cap is in a closed and locked position.

13. The cap security system of claim 6 wherein the lock cavity includes an opening defined by a lock cavity rim and further comprising a plate positioned proximally to the lock cavity rim and at least partly within the lock cavity such that the plate covers at least a portion of the lock cavity.

14. The cap security system of claim 9 further comprising a plate positioned proximally to the lock cavity rim and at least partly within the lock cavity such that the plate covers at least a portion of the lock cavity;
wherein the plate is secured to the cap by at least one fastener; and wherein the at least one fastener is positioned within the guard cavity when the cap is in the closed and locked position.

* * * * *